(12) United States Patent
Tokuda et al.

(10) Patent No.: US 6,598,019 B1
(45) Date of Patent: Jul. 22, 2003

(54) EVALUATION METHOD, APPARATUS, AND RECORDING MEDIUM USING OPTIMUM TEMPLATE PATTERN DETERMINATION METHOD, APPARATUS AND OPTIMUM TEMPLATE PATTERN

(75) Inventors: Naoyuki Tokuda, Kokubunji (JP); Hiroyuki Sasai, Fussa (JP)

(73) Assignee: Sunflare Co., Ltd., Tokyo (JP)

( * ) Notice: Subject to any disclaimer, the term of this patent is extended or adjusted under 35 U.S.C. 154(b) by 373 days.

(21) Appl. No.: 09/597,269

(22) Filed: Jun. 20, 2000

(51) Int. Cl.$^7$ .................. G10L 15/28; G10L 15/04; G10L 15/18; G10L 15/08
(52) U.S. Cl. ............... 704/255; 704/251; 704/257; 704/236
(58) Field of Search ............... 704/3, 9, 7, 251, 704/255, 257, 236

(56) References Cited

U.S. PATENT DOCUMENTS

| | | | |
|---|---|---|---|
| 4,507,750 A | * 3/1985 | Frantz et al. ................. | 704/7 |
| 5,905,972 A | * 5/1999 | Huang et al. ................ | 704/258 |
| 6,278,967 B1 | * 8/2001 | Akers et al. ................. | 704/ |
| 6,289,304 B1 | * 9/2001 | Grefenstette ................. | 704/9 9 |

FOREIGN PATENT DOCUMENTS

| | | | | |
|---|---|---|---|---|
| JP | 03-116273 | * | 5/1991 | ........... G06F/15/38 |
| JP | 09-325673 | * | 12/1997 | ........... G06F/17/27 |
| JP | 2000-200275 | * | 7/2000 | ........... G06F/17/28 |
| JP | 2002-232576 | * | 2/2002 | ........... G06F/17/27 |

\* cited by examiner

*Primary Examiner*—Doris H. To
*Assistant Examiner*—Daniel A Nolan
(74) *Attorney, Agent, or Firm*—Liniak, Berenato & White

(57) ABSTRACT

To improve the precision in correction of an input sentence by using a template pattern for model sentence. A plurality of template patterns for the model sentence are provided beforehand. Each of the template patterns is regarded as a plurality of templates of words/phrases based on expertise of language teachers with scores assigned to the words according to their importance. The scores and subsequently the input sentence are read and analyzed in comparison with each of the template patterns and the total of scores of matching words is calculated. A template pattern having the highest total score is selected as an optimum template pattern and the input sentence is corrected using the optimum template pattern. This method improves the likelihood that a template pattern containing a larger number of important words is selected as the optimum template pattern.

3 Claims, 3 Drawing Sheets

EVALUATION METHOD, APPARATUS, AND RECORDING MEDIUM USING OPTIMUM TEMPLATE PATTERN DETERMINATION METHOD, APPARATUS AND OPTIMUM TEMPLATE PATTERN

BACKGROUND OF THE INVENTION

1. Field of the Invention

The present invention relates to an evaluation method, apparatus, and recording medium using an optimum template pattern determination method, apparatus, and an optimum template pattern, used in, for example, correcting and evaluating a translation. In particular, the present invention relates to an evaluation method, apparatus, and recording medium using an optimum pattern determination method, apparatus, and an optimum template pattern which allow for determining an optimum template pattern based on some words having greater importance than other words and evaluating an input sentence based on the optimum template pattern.

2. Description of the Prior Art

In technical translator training courses, a method is generally used in which students send their assigned translations to the tutoring center, where the translations are corrected, evaluated, and sent back to the students, and the students review the corrections and know their rating.

Conventionally, a method has been used to correct translations in which a large number of translations sent from students are distributed among a number of tutors and each of the tutors manually corrects errors in the translations. However, there are problems with this method: the manual correction requires a great deal of time. In addition, since it is not necessarily easy to employ tutors having ability at a certain level or higher, the corrections may vary depending on the tutors.

The inventors previously proposed a translation correction support apparatus that provides results nearly equal to those from manual correction by experts, as disclosed in Japanese Patent Laid-Open No. 9-325673.

BRIEF SUMMARY OF THE INVENTION

Object of the Invention

In the translation correction support apparatus previously proposed by the inventors, a plurality of template patterns are provided, each of which corresponds to a model translation. A template pattern which matches the student's translation is determined, the translation is regarded in the light of templates similar to the matching template pattern, then the differences between each template and the student's translation are determined to produce the resulting corrections. Very precise corrections can be obtained by this apparatus if the student's translations have only few errors.

However, if the student's translation has a number of errors as in, for example, general language schools, it is impossible for a given model translation, to provide sufficient quantity of corresponding template patterns which accommodate all the possible error variations. As a result, it often occurs that a translation matches none of the translation patterns of the model translation provided beforehand.

Conventionally, in such an application, the student's translation is compared with each of the template patterns of a model translation and the template pattern having the largest number of words that match words in the student's translation is selected as the optimum template pattern. However, if the template pattern for the model translation is selected simply because it has the largest number of matching words, the selected template pattern may not necessarily match the template pattern which the student intends in the translation and therefore a precise correction and a proper evaluation of the input translation cannot be expected.

Such a problem occurs not only in the translation correction support apparatus, but also often in information retrieval, in which certain information is retrieved based on query in an information retrieval system using the Internet, for example.

The present invention was devised in view of the above-mentioned state, and it is an object of the present invention to provide an optimum template decision method, apparatus, and recording medium which ensure that the same template pattern as that of an input sentence which the person inputting the sentence intends is selected as the template for a model sentence.

It is another object of the present invention to provide an evaluation method, apparatus, and recording medium using an optimum template pattern which allow a proper evaluation of an input sentence based on the optimum template pattern selected in the above-mentioned way.

SUMMARY OF THE INVENTION

To achieve these objects, the present invention provides a method for determining an optimum template pattern for the model sentence, wherein the plurality of template patterns for a model sentence, each of which being regarded as an arbitrary number of templates, are provided beforehand. Each of the template patterns is compared with an input sentence to determine a template pattern most appropriate for the input sentence as the optimum template pattern. This method is characterized by assigning scores to all the words used in each of the template patterns according to their importance and comparing the input sentence with each of the template patterns to determine the template pattern having the highest total of scores of all the matching words as the optimum template pattern. Since the scores are assigned to the words according to their importance and the optimum template pattern is determined based on the total of the scores of matching words, it is ensured that the same template pattern as input sentence's template pattern intended by the person who input that sentence can be selected and determined as the optimum template pattern for the model sentence.

The present invention further provides an evaluation method using an optimum template pattern, wherein a plurality of template patterns for a model sentence, each of which is regarded as an arbitrary number of templates, are provided beforehand. Each of the template patterns is compared with an input sentence to determine the template pattern most appropriate for the input pattern as an optimum template pattern. Then the input sentence is evaluated based on the optimum template pattern. The method is characterized by assigning scores to all the words used in each of the template patterns according to their importance and comparing the input sentence with each of the template patterns to determine the template pattern having the highest total of scores of all the matching words as the optimum template pattern. Then the input sentence is evaluated based on the product that is yielded by multiplying the number of the matching words in the input sentence, divided by the total number of the words in the input sentence, by the score of the matching words in the input sentence, divided by the total score of the optimum template pattern. Thus, the input sentence can be evaluated properly by taking into account whether the person who input the sentence understands the rules of grammar and knows important words.

The present invention further provides an apparatus for determining an optimum template pattern, wherein a plurality of template patterns for a model sentence, each of which is regarded as an arbitrary number of templates, are provided beforehand. Each of the template patterns is compared with the input sentence to determine the template pattern most appropriate for the input pattern as an optimum template pattern. The apparatus comprises a template pattern storage means for storing each of the template patterns; an input sentence storage means for storing the input sentence; and a word score storage means for storing scores assigned to all the words used in each of the template patterns according to their importance, by associating the scores with the words. The apparatus further comprise a matching word retrieval means for retrieving words in each template pattern which match the words in the input sentence; a score calculation means for calculating the total of the scores of matching words in each template pattern; and an optimum template pattern selection means for selecting the template pattern having the highest total score as the optimum template pattern; wherein the total of the scores of matching words is calculated in said score calculation means and the optimum template pattern is selected based on the result of the calculation. Thus, the likelihood that a template pattern containing a larger number of important words is selected as the optimum template pattern is increased and therefore it is ensured that the same template pattern as the input sentence's template pattern intended by the person who input that sentence is selected and determined as the optimum template pattern for the model sentence.

The present invention provides an evaluation apparatus using an optimum template pattern, wherein a plurality of template patterns for a model sentence, each of which being regarded as an arbitrary number of templates, are provided beforehand. Each of the template patterns is compared with the input sentence to determine the template pattern most appropriate for the input pattern as an optimum template pattern. Then evaluating the input sentence is evaluated based on the optimum template pattern. The evaluation apparatus comprises a template pattern storage means for storing each of said template patterns; an input sentence storage means for storing said input sentence; and a word score storage means for storing in a memory area the scores assigned to all the words used in each of said template patterns according to their importance by associating the scores with the words. The evaluation apparatus further comprises a matching word retrieval means for retrieving words in each template pattern which match the words in the input sentence; a score calculation means for calculating the total of the scores of matching words in each template pattern; an optimum template pattern selection means for selecting a template pattern having the highest total score as the optimum template pattern; an optimum template pattern total score calculation means for calculating the total score of the optimum template pattern; a matching word count calculation means for calculating the number of matching words in the input sentence; and an input sentence evaluation means for evaluating the input sentence based on the product that is yielded by multiplying the number of the matching words in the input sentence, divided by the number of all the words in the input sentence, by the score of the matching words in the input sentence divided by the total score of the optimum template pattern. Thus, the same template pattern as the input sentence's template pattern intended by the person who input that sentence can be used to evaluate the input sentence, allowing for high reliability.

The present invention is further characterized by causing a computer to perform processes of: storing in a memory area a plurality of template patterns for a model sentence, each of which is regarded as an arbitrary number of templates; storing an input sentence in a memory area; storing the scores assigned to words used in each of the template patterns according to their importance by associating the scores with the words; and comparing the input sentence with each of the template patterns to select a template pattern having the highest total of the scores of matching words as an optimum template pattern. By the above-mentioned processes, the likelihood that a template pattern containing a larger number of important words having a higher score is selected as the optimum template pattern is increased and therefore the same template pattern as the input sentence's template pattern intended by the person who input that sentence can be selected and determined as the optimum template pattern for the model sentence.

The present invention is further characterized by causing a computer to perform processes of: storing in a memory area a plurality of template patterns for a model sentence, each of which is regarded as an arbitrary number of templates; storing an input sentence in a memory area; storing in a memory area the scores assigned to the words used in each of the template pattern according to their importance, by associating the scores with the words; comparing the input sentence with each of the template patterns to select the template pattern having the highest total of the scores of matching words as the optimum template pattern. The computer next evaluates the input sentence based on the product that is yielded by multiplying the number of the matching words in the input sentence divided the number of all the words in the input sentence, by the score of the matching words in the input sentence, divided by the total score of the optimum template pattern. By the above-mentioned processes, the input sentence can be evaluated properly.

DETAILED DESCRIPTION OF THE PREFERRED EMBODIMENTS

The present invention will be described below with reference to the drawings.

Figure 1:
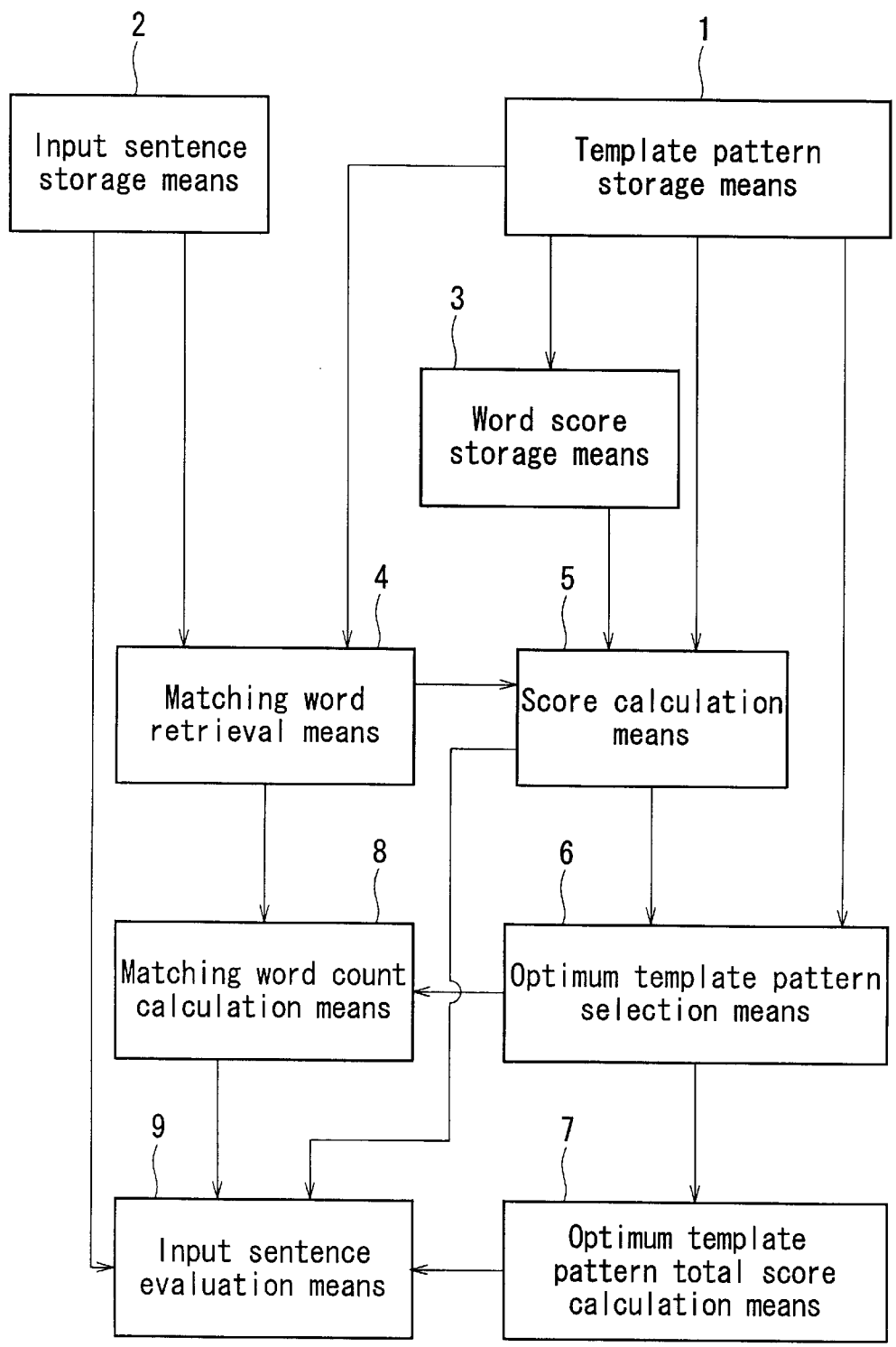
FIG. 1 is a general block diagram of an apparatus for determining an optimum template pattern and evaluating an input sentence according to the one embodiment of the present invention.

FIG. 1 shows an apparatus for determining an optimum template pattern and evaluating an input sentence, according to one embodiment of the present invention. The apparatus comprises template pattern storage means 1 for storing a plurality of template patterns for a model sentence, each of which is regarded as an arbitrary number of templates, input sentence storage means 2 for storing an input sentence, and word score storage means 3 for storing scores pre-assigned to all the words used in the template patterns according to their importance, by associating with the words.

The input sentence stored in the input sentence storage means 2 is, together with the template patterns stored in the template pattern storage means 1, input into matching word retrieval means 4. The input sentence is compared with each of the template patterns, and the words in each template pattern which match the words in the input sentence are retrieved in the matching word retrieval means 4. Then the total of the scores of the matching words in each template pattern is calculated in score calculation means 5. A template pattern having the highest total score is selected as the optimum template pattern in optimum template pattern selection means 6.

The total score of the optimum template pattern selected in the optimum template pattern selection means 6 is calculated in optimum template pattern total score calculation means 7 and the number of words in the input sentence which match words in the optimum template pattern is calculated in matching word count calculation means 8. In input sentence evaluation means 9, the number of the matching words in the input sentence, divided by the total number of the words in the input sentence, is multiplied by the score of the matching words in the input sentence, divided by the total score of the optimum template pattern, to yield a product, and the input sentence is evaluated based on the product.

Figure 2:
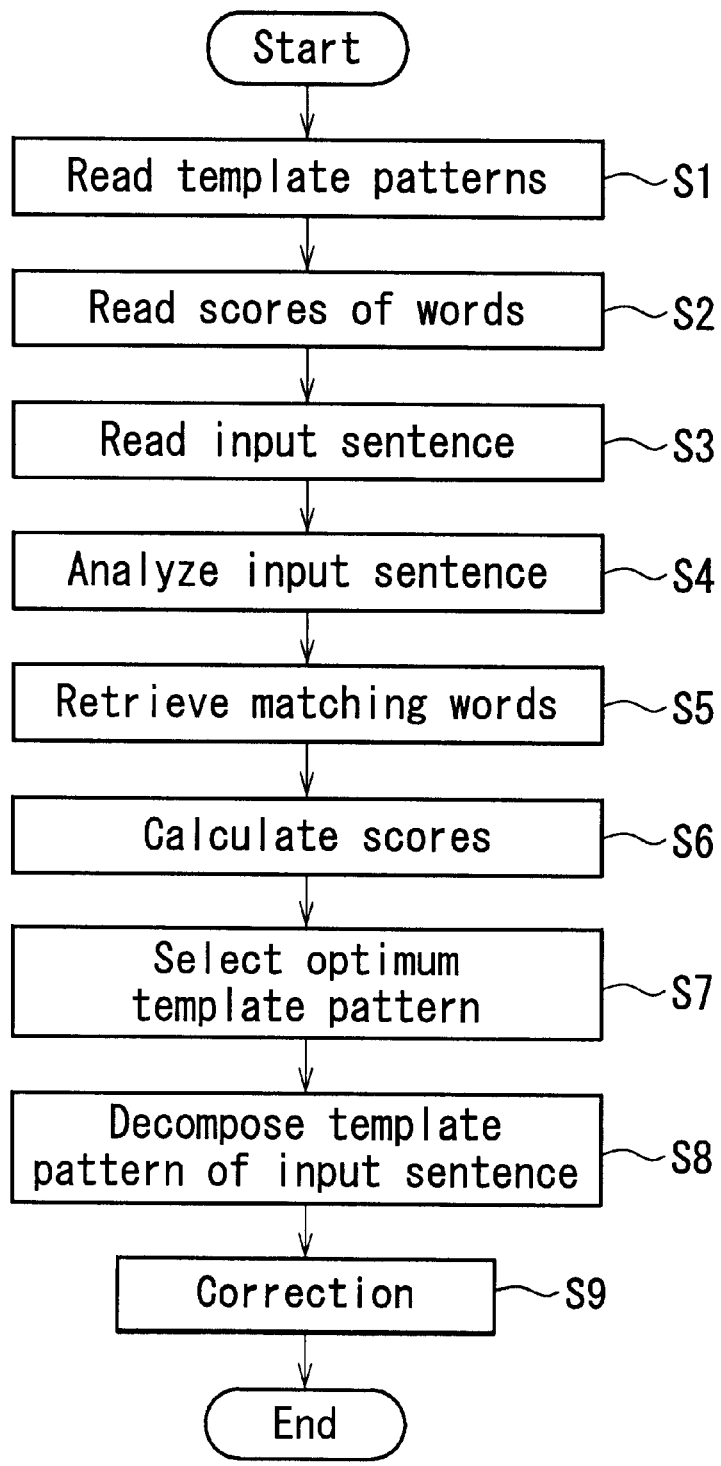
FIG. 2 is a flowchart of a method for determining an optimum template pattern performed by the apparatus shown in FIG. 1.

FIG. 2 shows a flowchart of a method for determining the optimum template pattern performed in the above-mentioned apparatus.

First, a plurality of template patterns for a model sentence corresponding to an input sentence are provided beforehand then, at step S1, they are read into the apparatus.

Suppose that an assignment consisting of the following Japanese text "日本には美しい公園が沢山ある。" is given. Then, for example, three template patterns A, B, and C, each of which is regarded as five templates T1, T2, T3, T4, and T5, are provided as template patterns for the model sentence corresponding to this input sentence, as shown in Table 1.

student's translations (input sentences). In such a case, the tutor would guide the students so that they use that sentence pattern to translate an assigned sentence during the course and the students would try to use that sentence pattern to translate the sentence. It is apparent that, when a student used the sentence pattern to translate the assigned sentence, it would be the evaluation that is appropriate for the intent of the student who presented the translation (input sentence) to the tutor if the tutor uses a template pattern conforming to the sentence pattern to evaluate the translation.

Thus, in the present invention, when a student used such a sentence pattern for translation, a template pattern conforming to the sentence pattern can be selected as the optimum template pattern, as will be described later in detail.

The multiplying factor for the score of important words is not limited to "3". Instead, it may be set arbitrarily, and a plurality of factors may be set, such that words of a higher scores than others by a factor of two, three, four, and so on are provided.

Once the scores of the words are read into the apparatus in this way, the input sentence is read at step S3 in FIG. 2. In the example described above, the input sentence is a translation presented by a student to the tutor. After the input sentence is read, it is analyzed at step S4.

This analysis of the input sentence involves, in the case of Japanese-into-English translation in the above-mentioned case, for example, key pattern checking by using a key pattern to determine whether the input sentence correctly conforms to basic usage classifying parts of speech of every word in the input sentence by using a built-in dictionary, and parsing by a parsing program, as described in the above mentioned Japanese Patent Laid-Open No. 9-325673 specification.

Then, words in each candidate template pattern which match words in the input sentence are retrieved at step S5 and the total of the scores of matching words in each template pattern is calculated at step S6. Then, the template

TABLE 1

|         | T1    | T2             | T3        | T4    | T5                    |
|---------|-------|----------------|-----------|-------|-----------------------|
| A       | Japan | has            | beautiful | parks | all over the country. |
| (Score) | 1     | 1              | 1         | 1     | 1  1  1  1            |
| B       | Japan | is dotted with | beautiful | parks | all over the country. |
| (Score) | 1     | 1  3  1        | 1         | 1     | 1  1  1  1            |
| C       | Japan | is dotted with | beautiful | parks | nationwide.           |
| (Score) | 1     | 1  3  1        | 1         | 1     | 3                     |

Here, each of the template patterns A, B, and C was decomposed by using the expertise of expert translators to identify the core components of a translation (model sentence) during correcting translations with the help of past correction samples and decomposing the model translation into sentence components, which as a unit are called templates as a unit.

Then, at step 2, scores are assigned to all the words used in each of the template patterns according to their importance.

Table 1 shows an example. Score "1" is assigned to words except the words "dotted" and "nationwide" to which score "3", three times higher than other words, is assigned. That is, the words "dotted" and "nationwide" are set up as important words having importance three times greater than the other words.

Here, the important words are set up for, for example, emphasizing a sentence pattern which a tutor wants the students to learn without fail when the tutor corrects the pattern having the highest total score is selected and determined as the optimum template pattern at step S7.

For, example, suppose that the student's translation (input sentence) in response to the assignment given above is as follows:

"Japan has dotted beautiful parks all over nationwide."

Then the scores of matching words in each of the template patterns A, B, and C in Table 1 will be as given in Table 2.

TABLE 2

|   | Score of matching words | The Number of matching words |
|---|-------------------------|------------------------------|
| A | 6                       | 6                            |
| B | 8                       | 6                            |
| C | 9                       | 5                            |

Because, the score of template pattern A is "6", the score of template pattern B is "8", and the score of template pattern C is "9" as can be seen in Table 2, template pattern C is selected as the optimum template pattern.

The number of matching words in template pattern A and B is "6" and the number of matching words in template pattern C is "5" as shown in Table 2. In the prior art, because a template pattern containing the largest number of matching words was selected as the optimum template pattern, template pattern A or B would be selected as the optimum template pattern.

In the student's translation given above, the student apparently made a try to use the words "dotted" and "nationwide" to translate the assignment. Therefore, it is apparent that correcting the student's translation by using template pattern C is appropriate for the student's intent.

On the other hand, if the student's translation (input sentence) for the assigned sentence given above is "Japan is dotted with beautiful parks country.", then the scores of matching words in template patterns A, B, and C given in Table 1 will be as given in Table 3.

TABLE 3

|   | Score of matching words | The number of matching words |
|---|---|---|
| A | 4 | 4 |
| B | 9 | 7 |
| C | 8 | 6 |

As can be seen from Table 3, the score of matching words in template pattern A is "4", the score of matching words in template pattern B is "9", and the score of matching words in template pattern C is "8". Thus, template pattern B is selected as the optimum template pattern.

Since the number of matching words in template pattern A is "4", in template pattern "7", and in template pattern "6" as shown in Table 3, the result described above would be the same as in the case where the conventional method is used in which a template pattern having the largest number of matching words is selected as the optimum template pattern.

Once the optimum template pattern is selected in this way, the input sentence is regarded as templates similar to the optimum template pattern at step S8 in FIG. 2. An example of this is given in Table 4. Templates t1, t2, t3, t4, and t5 correspond to templates T1, T2, T3, T4, and T5 of template patterns B and C, respectively.

TABLE 4

| t1 | t2 | t3 | t4 | t5 |
|---|---|---|---|---|
| Japan | Has dotted | beautiful | parks | all over nationwide. |
| Japan | is dotted with | beautiful | parks | country. |

After the template pattern decomposition of the input sentence is completed in this way, the input sentence is corrected at step S9. The correction method is the same as that described in Japanese Patent Laid-Open No. 9-325673 specification.

In this way, scores are assigned to all the words used in each of the template patterns A, B, and C, according to their importance, and the input sentence is compared with each of the template patterns A, B, and C to select template patterns B and C which have the highest total of the scores of all the matching words as the optimum template pattern. Thus, the input sentence can be corrected in conformity with the intended content of the input sentence, thereby allowing for extremely precise corrections.

Figure 3:
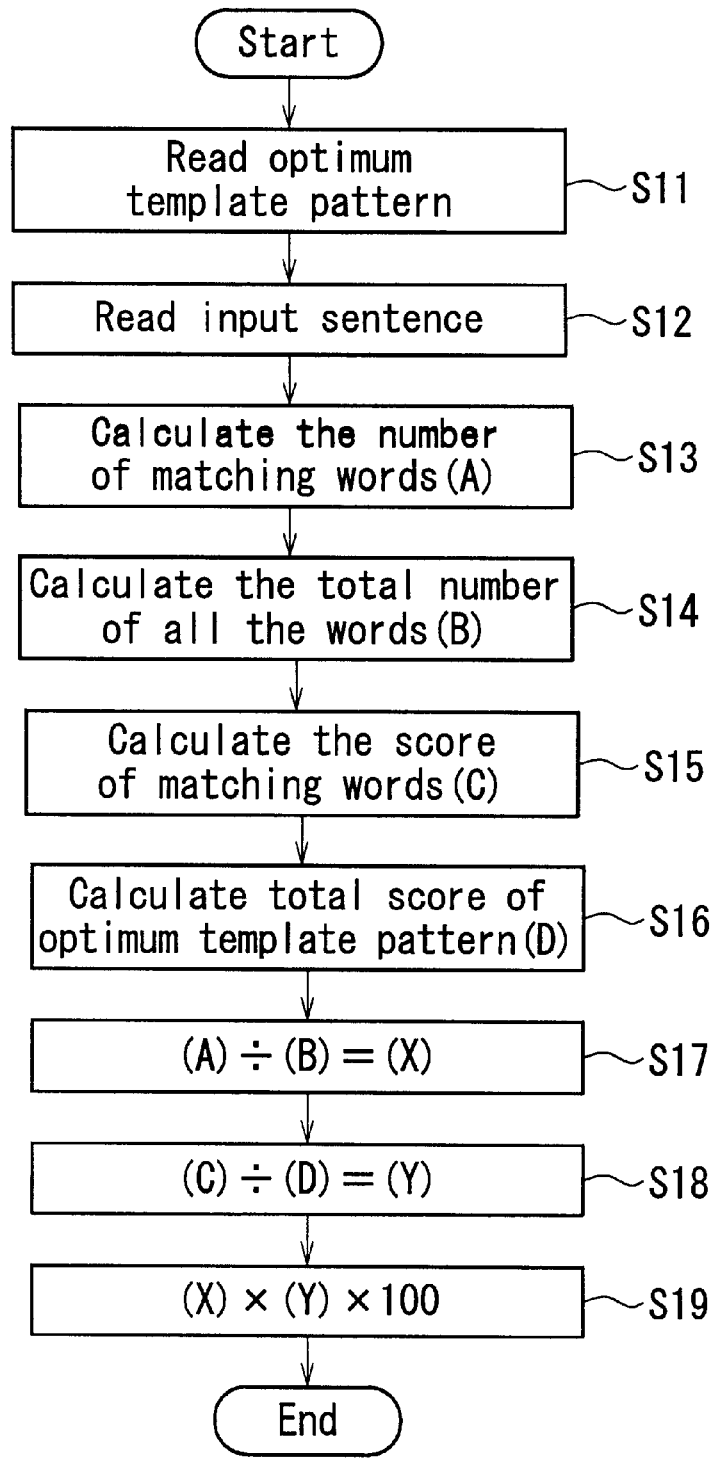
FIG. 3 is a flowchart of a method for evaluating an input sentence performed by the apparatus shown in FIG. 1.

FIG. 3 shows a flowchart of a method for evaluating an input sentence using an optimum template pattern performed in the apparatus described above. This method will be described below.

First, the optimum template pattern is read into the apparatus at step S11 and the input sentence is read at step S12.

Next, the number of words in the input sentence read (A) is calculated at step S13. Particularly, in the case of the first input sentence described above with respect to Table 2, (A)=5 is read. In the case of the second input sentence described above with respect to Table 3, (A)=7 is read.

Then, the total of the number of words in the input sentence (B) is calculated at step S14. Particularly, in the case of the first input sentence described above with respect to Table 2, (B)=8 is read. In the case of the second input sentence described above with respect to Table 3, (B)=10 is read.

Then, at step S15, the scores of the matching words in the input sentence (C) are calculated. Particularly, in the case of the first input sentence described above with respect to Table 2, (C)=9 is read. In the case of the second input sentence described above with respect to Table 3, (C)=9 is read.

Then, at step S16, the total score of the optimum template pattern (D) is calculated. Particularly, in the case where template pattern C shown in Table 1 is selected as the optimum template pattern (for the first input sentence), (D)=11 is read. In the case where template pattern B is selected as the optimum template pattern (for the second input sentence), (D)=12 is read.

Then, the number of matching words in the input sentence (A) is divided by the total of the number of the words in the input sentence (B) to yield the result (X) at step S17, and the score of the matching words in the input sentence (C) is divided by the total score of the optimum template pattern (D) to yield the result (Y). Finally, the results (X), (Y) are used to obtain the rating of the input sentence in scores. Equations 1, 2, and 3 represent the calculations at step S17, S18, and S19, respectively.

$$(A) \div (B) = (X) \quad [\text{Equation 1}]$$

$$(C) \div (D) = (Y) \quad [\text{Equation 2}]$$

$$(X) \times (Y) \times 100 = \text{evaluation} \quad [\text{Equation 3}]$$

Here, Equation 1 provides a measure for determining to what degree the person (student) who input the sentence reasoned through the assigned sentence to translate it. Using this measure, the rating may be lowered if the student used a guesswork to a large extent or if the student knows words but is poor at grammar.

Equation 2 provides a measure allowing the number of words misused by the person (student) who input the sentence to be reflected in the evaluation. Using this measure, the rating may be lowered if the student is poor in vocabulary, or if the student knows only basic words and does not use important words.

Thus, the method for evaluating an input sentence according to the present invention takes into account the richness of vocabulary and the knowledge about important rules of grammar and about words of the person (student) who input the sentence.

The method for evaluating an input sentence will be described in detail. In the case where template pattern C in Table 1 is selected as the optimum template pattern (in the case of the first input sentence), an evaluation of 51.1 will be obtained, as represented by Equation 4. In the case where template pattern B in Table 1 is selected as the optimum template pattern (in the case of the second input sentence), an evaluation of 52.5 will be obtained, as represented by Equation 5.

$$(5/8) \times (9/11) \times 100 = 51.1 \text{ (scores)} \quad \text{[Equation 4]}$$

$$(7/10) \times (9/12) \times 100 = 52.5 \text{ (scores)} \quad \text{[Equation 5]}$$

Comparing these results, even though an important word, "nationwide", is used in the first sentence, the rating of the first sentence is lower than the second one, in which this important word is not used.

This is because, in the first sentence, "with" is not used in association with "dotted", "is" is mistakenly used instead of "has", and the unnecessary words, "all over", are used in combination with "nationwide".

Thus, this input sentence evaluation method allows the ability of the person (student) who input the sentence to be correctly evaluated and the student to know his/her weak scores from the evaluation.

While the embodiment has been described with respect to Japanese-into-English translation by way of example, the present invention equally applied to English-into-Japanese translation and translation between other languages. In addition, as mentioned earlier, the present invention also can be applied to retrieval of given information based on an input sentence in information retrieval systems using, for example, the Internet, by using a template pattern having compound information consisting of natural language sentences as a search key.

As described above, the present invention provides a method for determining an optimum template pattern for a model sentence, wherein a plurality of template patterns for a model sentence, each of which is regarded as an arbitrary number of templates, are provided beforehand, and each of the template patterns is compared with an input sentence to determine the template pattern most appropriate for the input sentence as the optimum template pattern; the method is characterized by: assigning scores to all the words used in each of the template patterns according to their importance, and comparing the input sentence with each of the template patterns to determine the template pattern having the highest total of scores of all the matching words as the optimum template pattern, thereby ensuring that the same template pattern as the input sentence's template pattern intended by the person who input that sentence can be selected and determined as the optimum template pattern for the model sentence.

The present invention further provides an evaluation method using an optimum template pattern, wherein a plurality of template patterns for a model sentence, each of which is regarded as an arbitrary number of templates, are provided beforehand, each of the template patterns is compared with the input sentence to determine the template pattern most appropriate for the input pattern as an optimum template pattern, then evaluating the input sentence based on the optimum template pattern. The method is characterized by: assigning scores to all the words used in each of the template patterns according to their importance; comparing the input sentence with each of the template patterns to determine the template pattern having the highest total of scores of all the matching words as the optimum template pattern; and evaluating the input sentence based on the product that is yielded by multiplying the number of the matching words in the input sentence, divided by the total number of the words in the input sentence by the score of the matching words in the input sentence, divided by the total score of the optimum template pattern. Thus, the input sentence can be evaluated properly by taking into account whether the person who input the sentence understands the rules of grammar and knows important words.

The present invention further provides an apparatus for determining an optimum template pattern, wherein a plurality of template patterns for a model sentence, each of which is regarded as an arbitrary number of templates, are provided beforehand, each of the template patterns is compared with the input sentence to determine the template pattern most appropriate for the input pattern as an optimum template pattern, said apparatus comprising a template pattern storage means for storing each of the template patterns; an input sentence storage means for storing the input sentence; a word score storage means for storing scores assigned to all the words used in each of the template patterns according to their importance, by associating the scores with the words; a matching word retrieval means for retrieving words in each template pattern which match the words in the input sentence; a score calculation means for calculating the total of the scores of matching words in each template pattern; and an optimum template pattern selection means for selecting the template pattern having the highest total score as the optimum template pattern; wherein the total of the scores of matching words is calculated in said score calculation means and the optimum template pattern is selected based on the result of the calculation. Thus, the likelihood that a template pattern containing a larger number of important words is selected as the optimum template pattern is increased, and therefore it is ensured that the same template pattern as input sentence's template pattern intended by the person who input that sentence is selected and determined as the optimum template pattern for the model sentence.

The present invention provides an evaluation apparatus using an optimum template pattern, wherein a plurality of template patterns for a model sentence, each of which is regarded as an arbitrary number of templates, are provided beforehand, each of the template patterns is compared with the input sentence to determine the template pattern most appropriate for the input pattern as an optimum template pattern, then evaluating the input sentence based on the optimum template pattern, the evaluation apparatus comprising a template pattern storage means for storing each of said template patterns; an input sentence storage means for storing said input sentence; a word score storage means for storing in a memory area the scores assigned to all the words used in each of said template patterns according to their importance, by associating the scores with the words; a matching word retrieval means for retrieving words in each template pattern which match the words in the input sentence; a score calculation means for calculating the total of the scores of matching words in each template pattern; an optimum template pattern selection means for selecting a template pattern having the highest total score as the optimum template pattern; an optimum template pattern total score calculation means for calculating the total score of the optimum template pattern; a matching word count calculation means for calculating the number of matching words in the input sentence; and an input sentence evaluation means for evaluating the input sentence based on the product that is yielded by multiplying the number of the matching words in the input sentence divided by the number of all the words in the input sentence by the score of the matching words in the input sentence divided by the total score of the optimum template pattern. Thus, the same template pattern as the input sentence's template pattern intended by the person who input that sentence can be used to evaluate the input sentence, allowing for high reliability.

The present invention also causes a computer to perform processes of: storing in a memory area a plurality of template patterns for a model sentence, each of which is regarded as an arbitrary number of templates; storing an input sentence in a memory area; storing scores assigned to words used in each of the template patterns according to their importance, by associating the scores with the words; and comparing the input sentence with each of the template patterns to select a template pattern having the highest total of the scores of matching words as an optimum template pattern. Thus, the likelihood that a template pattern containing a larger number of important words having a higher score is selected as the optimum template pattern is increased and therefore the same template pattern as the input sentence's template pattern intended by the person who input that sentence can be selected and determined as the optimum template pattern for the model sentence.

The present invention also causes a computer to perform processes of: storing in a memory area a plurality of template patterns for a model sentence, each of which is regarded as an arbitrary number of templates; storing an input sentence in a memory area; storing in a memory area the scores assigned to the words used in each of the template patterns according to their importance, by associating the scores with the words; comparing the input sentence with each of the template patterns to select a template pattern having the highest total of the scores of matching words as an optimum template pattern; and evaluating the input sentence based on the product that is yielded by multiplying the number of the matching words in the input sentence, divided by the number of all the words in the input sentence, by the score of the matching words in the input sentence, divided by the total score of the optimum template pattern. Thus, the input sentence can be evaluated properly.

What is claimed is:

1. An evaluation method using an optimum template pattern, said method comprising the steps of:
    providing a plurality of template patterns for a model sentence, each of the template patterns is regarded as an arbitrary number of templates,
    comparing each of the template patterns with the input sentence to determine a template pattern most appropriate for the input pattern as an optimum template pattern, then
    evaluating the input sentence based on the optimum template pattern, the method further comprising the steps of:
        assigning scores to all the words used in each of the template patterns according to their importance;
        comparing the input sentence with each of the template patterns to determine the template pattern having the highest total of scores of all the matching words as the optimum template pattern; and
        evaluating the input sentence based on the product that is yielded by:
        multiplying
            (the number of the matching words in the input sentence divided by the total number of the words in the input sentence)
        by
            (the score of the matching words in the input sentence divided by the total score of the optimum template pattern).

2. An evaluation apparatus using an optimum template pattern, wherein a plurality of template patterns for a model sentence, each of which is regarded as an arbitrary number of templates, are provided beforehand, each of the template patterns is compared with the input sentence to determine a template pattern most appropriate for the input pattern as an optimum template pattern, then the input sentence is evaluated based on the optimum template pattern, said evaluation apparatus comprising:
    a template pattern storage means for storing each of said template patterns;
    an input sentence storage means for storing said input sentence;
    a word score storage means for storing in a memory area scores assigned to all the words used in each of said template patterns according to their importance, by associating the scores with the words;
    matching word retrieval means for retrieving words in each template pattern which match the words in the input sentence;
    score calculation means for calculating the total of the scores of matching words in each template pattern;
    an optimum template pattern selection means for selecting a template pattern having the highest total score as the optimum template pattern;
    an optimum template pattern total score calculation means for calculating the total score of the optimum template pattern;
    a matching word count calculation means for calculating the number of matching words in the input sentence; and
    an input sentence evaluation means for evaluating the input sentence based on the product that is yielded by:
    multiplying
        (the number of the matching words in the input sentence divided by the number of all the words in the input sentence)
    by
        (the score of the matching words in the input sentence divided by the total score of the optimum template pattern).

3. A computer-readable recording medium on which a program is recorded for causing a computer to perform processes of:
    storing in a memory area a plurality of template patterns for a model sentence, each of which is regarded as an arbitrary number of templates;
    storing an input sentence in a memory area;
    storing in a memory area scores assigned to words used in each of said template pattern according to their importance, by associating the scores with the words;
    comparing the input sentence with each of the template patterns to select the template pattern having the highest total of the scores of matching words as the optimum template pattern; and
    evaluating the input sentence based on the product that is yielded by:
    multiplying
        (the number of the matching words in the input sentence divided the number of all the words in the input sentence)
    by
        (the score of the matching words in the input sentence divided by the total score of the optimum template pattern).

* * * * *